United States Patent
Fisher

[15] 3,657,938
[45] Apr. 25, 1972

[54] POWER TRANSMISSION BELT AND APPARATUS FOR AND METHOD OF MAKING SAME

[72] Inventor: David G. Fisher, Springfield, Mo.
[73] Assignee: Dayco Corporation, Dayton, Ohio
[22] Filed: Nov. 9, 1970
[21] Appl. No.: 88,040

[52] U.S. Cl. ................................74/233, 74/234, 156/140
[51] Int. Cl. ..................................F16g 5/16, B29h 7/22
[58] Field of Search ..............74/233, 234, 231 R; 156/140, 156/139, 137

[56] References Cited

UNITED STATES PATENTS 2,677,969  5/1954  Waugh........................................74/233
3,523,462  8/1970  Beindorf......................................74/233
3,584,516  6/1971  Burpulis......................................74/233

FOREIGN PATENTS OR APPLICATIONS 512,941  8/1952  Belgium.....................................156/139

Primary Examiner—Leonard H. Gerin
Attorney—Reuben Wolk

[57] ABSTRACT

A power transmission belt and an apparatus for and method of making such a belt are provided wherein the belt is adapted to be moved in an endless path and has a load-carrying section which is made of a plastic-like material having elongated particles made of a reinforcing material embedded therein and each of the particles has a longitudinal axis which is arranged substantially in alignment with the endless path.

16 Claims, 6 Drawing Figures

PATENTED APR 25 1972 3,657,938

INVENTOR
DAVID G. FISHER
BY
Reuben Wolk
ATTORNEY

POWER TRANSMISSION BELT AND APPARATUS FOR AND METHOD OF MAKING SAME

BACKGROUND OF THE INVENTION

Endless power transmission belts such as flat belts, V-belts, toothed belts, and the like, are often made using various types of elastomeric materials and may be made using injection molding techniques. In producing each of these belts considerable attention is given to providing a load-carrying section in each belt which is of optimum strength and minimum cost; nevertheless, the load-carrying sections of present belts either require the use of comparatively expensive materials or must be made using time consuming techniques in order to assure that their associated belts provide the required performance.

SUMMARY

This invention provides an improved endless power transmission belt of simple and economical construction and an improved apparatus and method for making such a belt. In particular, the belt of this invention has a load-carrying section which is made of a plastic-like material having elongated members or fibers made of a reinforcing material embedded therein and each of the members or fibers has a longitudinal axis which is arranged substantially in alignment with the endless path of the belt.

Other details, uses, and advantages of this invention will be readily apparent from the exemplary embodiment thereof presented in the following specification, claims and drawing.

BRIEF DESCRIPTION OF THE DRAWING

The accompanying drawing shows an exemplary embodiment of this invention, in which.

DESCRIPTION OF ILLUSTRATED EMBODIMENT

Figure 1:
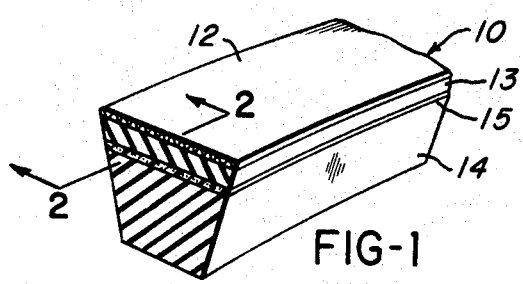
FIG. 1 is a fragmentary perspective view of a power transmission belt of this invention.

Reference is now made to FIG. 1 of the drawing which illustrates an exemplary embodiment of a power transmission belt of this invention in the form of a belt popularly referred to as a V-belt which is designated generally by the reference numeral 10. The belt 10 is made utilizing an apparatus or mold 11 illustrated in FIGS. 3 and 4.

The belt 10 comprises an outer fabric cover 12, a tension section 13, a compression section 14, and a load-carrying section 15 arranged between the tension section and the compression section. The load-carrying section is made separately as an endless member or band and has elongated members or fibers 16 of a reinforcing material embedded therein, see FIG. 2.

The tension section 13 is made of a material having high resiliency and the fabric cover 12 and tension section 13 are bonded together as a unit using any technique known in the art and the load-carrying section or member 15 is suitably bonded in position against the tension section to define an assembly 18. The assembly 18 is disposed within a cavity 17 of the mold 11 and the compression section 14 injection molded thereagainst in a manner to be described in detail subsequently to define the completed belt 10.

The member 15 may be bonded against the tension section 13 using suitable bonding means prior to insertion of the assembly 18 within the mold cavity 17 or the unit comprised of cover 12 and tension section 13 may be placed in the cavity 17 and the load-carrying member 15 bonded in position in the mold 11. This bonding may also be achieved simultaneously with the injection of the compression section 14 in the cavity 17 and the bonding of such compression section against member 15.

The mold 11 is comprised of a plurality of cooperating rings comprising a bottom ring 21, a central ring 22, and a top ring 23, which are suitably held together. The top ring 23 has a plurality of vertical passages 24 extending vertically therethrough and the passages 24 may be supplied with elastomeric material using any techniques known in the art. For example, the passages 24 may be supplied by a plurality of radially extending passages (not shown) which may be supplied by a central sprue, or the like.

The central ring 22 has a stepped surface 25 of roughly L-shaped cross-sectional outline formed therein and once the top ring 23 is suitably held in position in the assembled mold 11 the surface 25 cooperates with an oppositely arranged bottom surface 26 of the top ring 23 to define an annular passage 27 of rectangular cross-sectional outline which leads directly into the mold cavity 17. Thus, once the assembly 18 is installed in the mold 11 elastomeric material flows through the passages 24 into the annular passage 27 and into the mold cavity 17 to define the compression section 14 of the transmission belt 10. The belt 10 is then cured and cooled using conventional techniques and removed from the mold 11.

Figure 2:
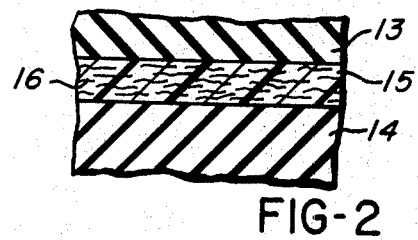
FIG. 2 is an enlarged fragmentary cross-sectional view taken essentially on the line 2—2 of FIG. 1.
Figure 3:
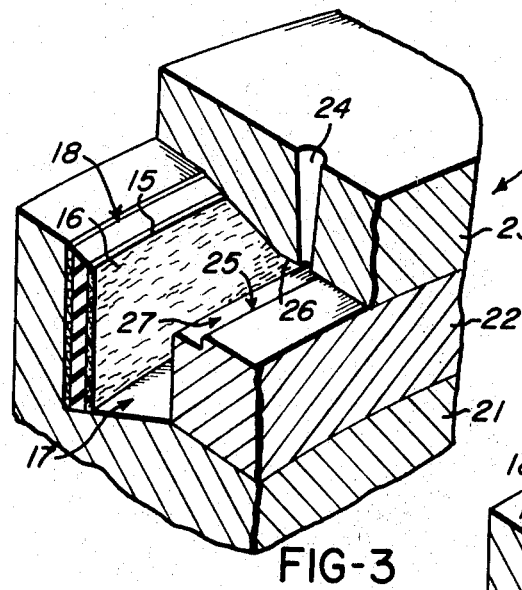
FIG. 3 is a fragmentary perspective view of an assembly having a tension section and a load-carrying section provided as a part thereof with such assembly being disposed within a cavity of an injection molding apparatus to enable injecting an elastomeric material within such cavity and against the load-carrying section to define a compression section and the completed belt of FIG. 1.
Figure 4:
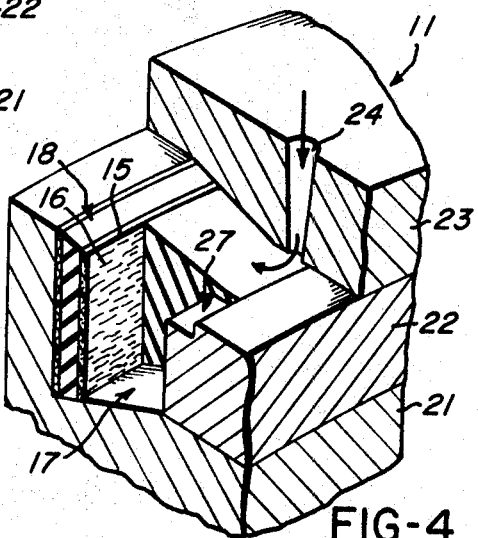
FIG. 4 is a view similar to FIG. 3 after injecting the elastomeric material in position to define the compression section.

The load-carrying member 15 is preferably made of a comparatively inexpensive plastic-like material which has the reinforcing fibers 16, see FIGS. 2-4, embedded therein. The member 15 is made by injection molding techniques using a mold 30 as shown in FIG. 5.

A flowable plastic-like material 31 with particles or fibers 16 dispersed therein is provided under pressure to the mold 30 using a conduit 32 which is in flow communication with a suitable source of such plastic-like material. The conduit 32 has a circular cross-sectional configuration and the elongated reinforcing fibers are randomly dispersed in the material without any particular orientation as illustrated at 33 in FIG. 5.

The conduit 32 introduces the material 31 into a dwell chamber 34 in the mold 30 and such chamber communicates with one end 35 of a gate 36 in the mold 30. The opposite end 37 of the gate 36 communicates with an annular chamber 40 in the mold 30. The annular chamber 40 is defined by a plurality of cooperating surfaces in the mold 30 and such surfaces define chamber 40 having a trapezoidal cross-sectional configuration, see FIG. 6.

Figure 5:
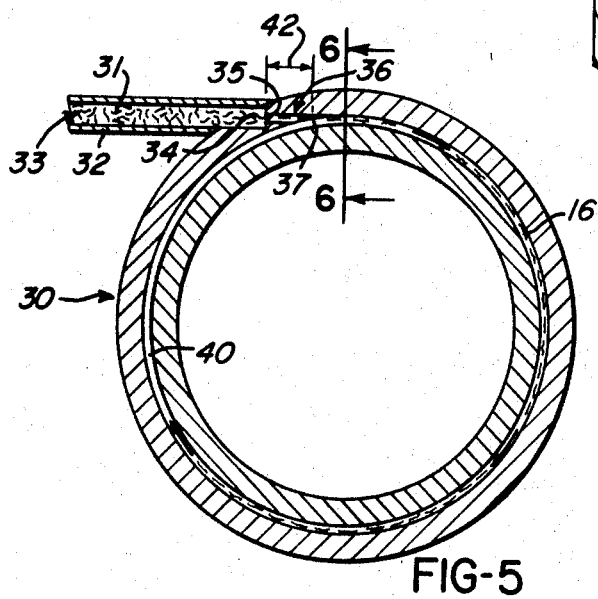
FIG. 5 is a schematic elevational view with parts in cross section and parts broken away illustrating an apparatus which may be used to define an endless load-carrying member for the exemplary belt of FIG. 1.
Figure 6:
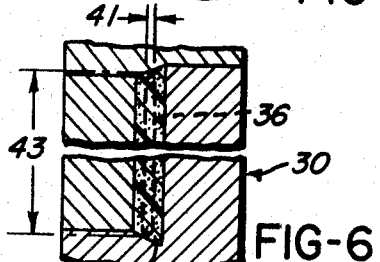
FIG. 6 is an enlarged cross-sectional view with parts broken away taken essentially on the line 6—6 of FIG. 5.

The gate 36 has what may be described as a flattened substantially oval configuration and has a height indicated at 41 in FIG. 6 which is quite small compared to the length 42 and width 43 of such opening, which are shown in FIGS. 5 and 6 respectively. The height 41 may be generally of the order of several thousandths of an inch and the configuration of the gate 36 assures that the reinforcing fibers 16 have their longitudinal axes aligned parallel to the opposed parallel walls or surfaces defining the height 41 of the gate 36.

The gate 36 may be in the form of a fan gate and is arranged so that its discharge end 37 is tangent to the annular chamber 40 in the mold 30. As the flowable plastic-like material 31 is injected into the chamber 34 the gate 36 aligns the reinforcing fibers 16 so that they flow substantially normal to a vertical plane through the outlet end of the gate 36. Thus, as the fibers or elongated-members 16 flow into the annular chamber 40 their axes are substantially in alignment with the endless path defined by chamber 40.

The material 31 with its oriented or aligned fibers 16 is then cured using any suitable technique known in the art to define the completed member 15. The aligned fibers have high tensile strength along their longitudinal axes and they serve to substantially increase the strength of the load-carrying member 15 while allowing such load-carrying section to be made of flexible comparatively inexpensive plastic-like materials. Further, by making the member 15 using injection molding techniques, it is possible to produce such member in an automated production line at minimum cost.

The annular chamber 40 of the mold 30 may have any desired cross-sectional configuration such as rectangular, trapezoidal, etc., to thereby define member 15 having a corresponding cross-sectional configuration. Further, the load-carrying member 15 may be dimensioned so that it extends across the full width of its belt 10 (as in this example) or may be smaller than the full width. In this latter instance, small widths of the elastomeric material used to define the compression section 14 would also be bonded in position against opposite side edges of the member 15.

Any suitable plastic-like material and associated reinforcing fibers may be used to define the load-carrying section or member 15. For example, member 15 may be made of nylon which has its fibers 16 provided in the form of fiber glass.

The belt 10 is shown as a V-belt having a standard roughly trapezoidal cross-sectional configuration. However, it will be appreciated that this invention may be employed to define belts having any desired configuration. Further, the tension and compression sections 13 and 14 respectively are preferably made of suitable natural or synthetic rubber compounds.

The height 41 of the gate 36 used to inject elastomeric material into the mold chamber 40 has been described as being generally of the order of several thousandths of an inch, and a height of 0.005 inch is considered acceptable for particles or fibers made of fiber glass. However, it will be appreciated that such height will be determined by the cross-sectional thickness of the fibers 16 and the properties of its associated plastic-like material 31.

The fibers or elongated particles 16 are comparatively short as compared to the overall length of the belt. For example, such fibers may be a fractional part of an inch in length, i.e., roughly one-half of an inch in length.

While present exemplary embodiments of this invention, and methods of practicing the same, have been illustrated and described, it will be recognized that this invention may be otherwise variously embodied and practiced within the scope of the following claims.

What is claimed is:

1. A power transmission belt adapted to be moved in an endless path, said belt comprising a tension section, a compression section, and a load-carrying section bonded against adjoining surfaces of said tension and compression sections, said load-carrying section being made of a plastic-like material and having elongated reinforcing particles embedded therein with each of said particles having a longitudinal axis which is arranged substantially in alignment with said endless path.

2. A belt as set forth in claim 1 in which said load-carrying section is made as a separate member and has one surface bonded against said tension section and said compression section is injection molded against a surface of said load-carring section which is arranged opposite from said one surface.

3. A belt as set forth in claim 1 in which said load-carrying section extends across the full width of said belt.

4. A belt as set forth in claim 1 in which said tension and compression sections are made of rubber, said load-carrying section is made of nylon, and said particles comprise particles made of fiber glass.

5. A method of making an endless power transmission belt comprising the steps of, providing a load-carrying member which is made of a plastic-like material and is adapted to be moved in an endless path, said member having reinforcing fibers embedded therein with their longitudinal axes arranged substantially parallel to said endless path, bonding said member to a construction which comprises a tension section in said belt to define an assembly, disposing said assembly in an annular cavity of an associated mold apparatus, and injection molding an elastomeric material against said member to define a compression section for said belt.

6. A method as set forth in claim 5 in which said bonding step comprises placing said construction in said cavity and bonding said member against said construction.

7. A method as set forth in claim 5 in which said providing step comprises flowing a flowable plastic-like material having reinforcing fibers randomly dispersed therein through a gate into an annular chamber of another mold causing the longitudinal axes of said fibers to be arranged substantially in alignment with an endless path defined by said chamber, and curing said flowable material to define said load-carrying member.

8. An injection molding apparatus for making a load-carrying member for a power transmission belt, said apparatus comprising, cooperating surfaces defining an annular chamber which is adapted to receive a flowable plastic-like material having reinforcing fibers dispersed therein, and a gate in said apparatus having a discharge end which is arranged tangent to said annular chamber, said gate causing the longitudinal axes of said fibers to be arranged substantially in alignment with an endless path defined by said chamber upon flowing said flowable plastic-like material and fibers therethrough.

9. An apparatus as set forth in claim 8 in which said gate has a height generally of the order of several thousandths of an inch and said discharge end extends across practically the full width of said annular chamber.

10. An apparatus as set forth in claim 8 in which said cooperating surfaces define a chamber having a trapezoidal cross-sectional outline whereby said load-carrying member is provided for a V-belt.

11. An apparatus as set forth in claim 8 and further comprising a dwell chamber provided in said apparatus, said dwell chamber being in flow communication with one end of said gate, and a conduit for supplying said flowable plastic-like material under pressure to said dwell chamber.

12. An apparatus as set forth in claim 8 in which said gate has a height generally of the order of several thousandths of an inch and said discharge end extends across practically the full width of said annular chamber, and said apparatus further comprising a dwell chamber provided therein, said dwell chamber being in flow communication with one end of said gate, and a conduit for supplying said flowable plastic-like material under pressure to said dwell chamber.

13. A method of making a load-carrying member for a power transmission belt, said method comprising the steps of, flowing a flowable plastic-like material having reinforcing fibers randomly dispersed therein through a gate into an annular chamber of a mold causing the longitudinal axes of said fibers to be arranged substantially in alignment with an endless path defined by said chamber, and curing said flowable material to define said load-carrying member having said reinforcing fibers aligned with the endless path of said member.

14. A method as set forth in claim 13 in which said flowing step comprises flowing a flowable nylon having reinforcing fibers of fiber glass randomly dispersed therein.

15. A method as set forth in claim 13 in which said flowing step comprises flowing said plastic-like material under pressure first through a dwell chamber which communicates with said gate and then through said gate.

16. A method as set forth in claim 13 in which said flowing step comprises flowing a flowable nylon having fibers of fiber glass dispersed therein and said flowing step further comprises flowing said nylon and its dispersed fibers through a gate having a height generally of the order of 0.005 inch and a width at its discharge end which extends across practically the full width of said annular chamber.

* * * * *